(No Model.)
J. BUESCH.
HORSE DETACHING DEVICE.
No. 301,207. Patented July 1, 1884.
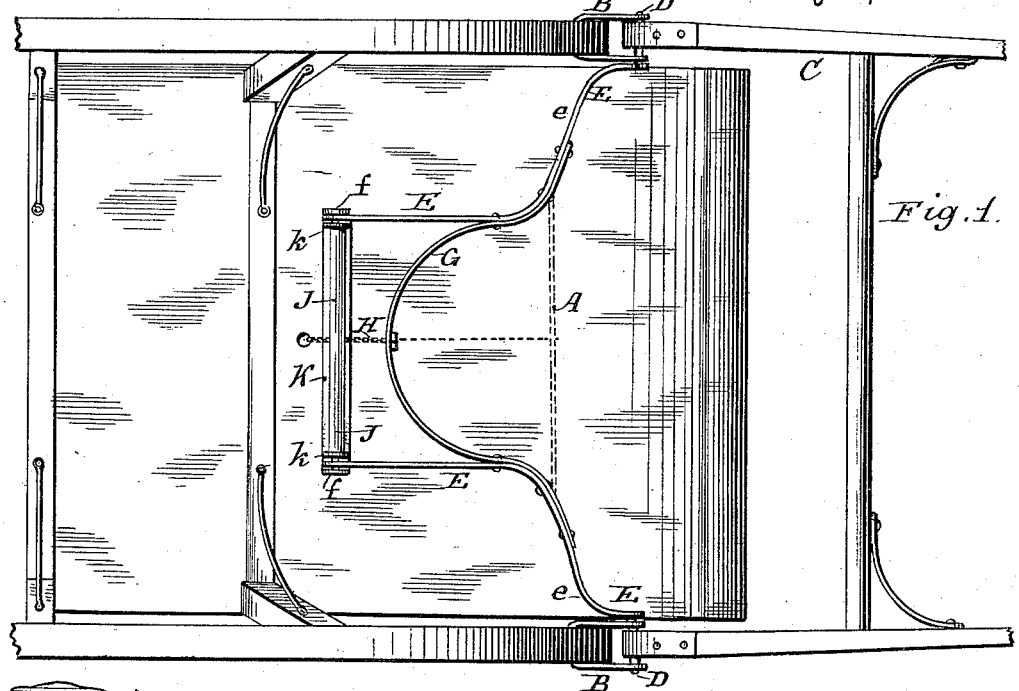
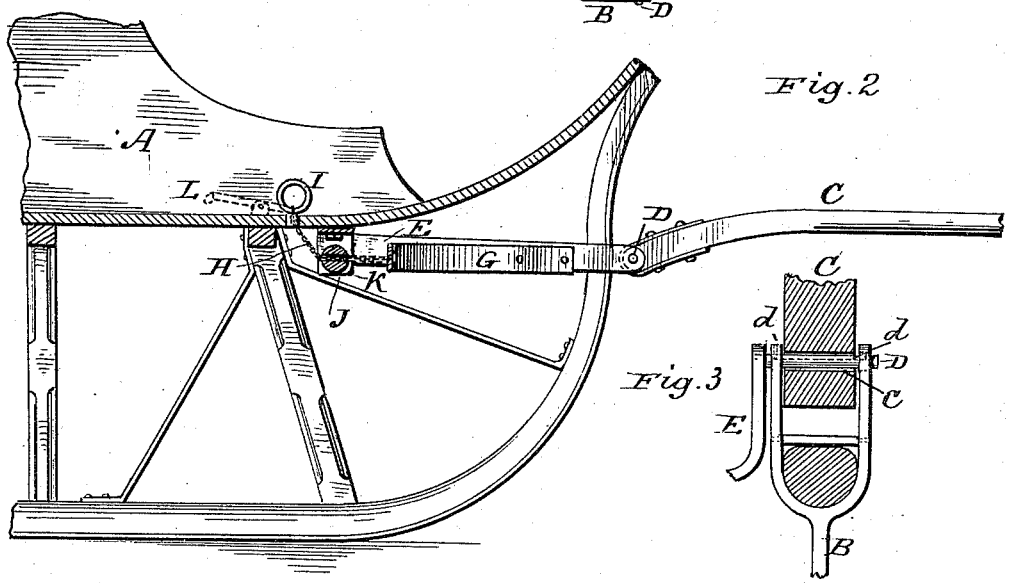
Witnesses:
L. C. Hills
E. E. Masson
Inventor:
Julius Buesch
By E. B. Stocking
Atty.

UNITED STATES PATENT OFFICE.

JULIUS BUESCH, OF ALLENTOWN, PENNSYLVANIA.

HORSE-DETACHING DEVICE.

SPECIFICATION forming part of Letters Patent No. 301,207, dated July 1, 1884.

Application filed February 12, 1884. (No model.)

*To all whom it may concern:*

Be it known that I, JULIUS BUESCH, a citizen of the United States, residing at Allentown, in the county of Lehigh and State of Pennsylvania, have invented certain new and useful Improvements in Horse-Detaching Devices for Vehicles, of which the following is a specification, reference being had therein to the accompanying drawings, in which—

Figure 1 is a bottom plan; Fig. 2, a vertical section; and Fig. 3 a detail, partly in section, of a horse-detaching device constructed in accordance with my invention.

Like letters refer to like parts in all the figures.

The object of my invention is the provision of means for readily detaching horses from vehicles in cases of accidents, or when the horse or horses become uncontrollable, and thus to secure the occupants of the vehicle from injury; and my invention consists in certain devices and combinations of devices hereinafter described, and specifically set forth in the claims.

A represents the body of a sleigh, or it may be that of any other vehicle drawn by animals; B, the draw-bar, and C the thills or shafts, or, it may be, the pole—that is to say, the draw-bar, body, and shafts or thills, herein shown, are considered the full equivalents of the same elements of a carriage or other vehicle adapted to be drawn by animals. In this instance each draw-bar is U-shaped at the end where the thills are connected therewith, but it is evident that any draw-bar having an ordinary eye for the connecting-bolt is adapted for the application of my invention thereto—as, for instance, the outer leg of the U, herein shown, may be dispensed with, and the inner leg would constitute what I have above mentioned as an ordinary "draw-bar," though both forms are common. Each of the connecting-bolts or coupling-pins D passes from the inside through both branches of the draw-bar, and through a bolt-hole, $c$, of somewhat larger diameter than the bolt in the ends of the shafts, or, in case of a pole, in each end of the usual pole iron. The inner end of the bolt is secured to the free end of a metal strap or bar, E, which extends backward, and is secured by a pin, bolt, or rivet to a bracket, $f$, fastened to the body of the vehicle. The strap E is in this instance curved inwardly at $e$ before it is extended directly to the bracket $f$; but this is not an essential formation, as it will hereinafter appear that, if desired, it may extend directly back from the bolt D to the bracket $f$, located, as shown, or at or nearer to the side of the vehicle. At a suitable point on each strap, and preferably nearer to the bolt D than to the bracket $f$, there is attached a rigid flexible strap, G, which, in this instance, is curved rearwardly, but which, if desired, may be straight, as shown by parallel dotted lines joining the two straps E. From the center of the strap G a cord, strap, or chain, H, extends rearwardly and upwardly through any suitable opening in the bottom of the body A, and is at its end provided with any suitable ring, stirrup, loop, or handle I.

As thus far described, the devices are capable of the following operation. In case it is desired to detach the shafts from the vehicle, the occupant has but to pull upon the chain H, and thus draw the flexible strap G backward at its center, when it will exert a force against or upon the straps E which will be resisted at its pivoted end by the bracket $f$ and the pin, bolt, or rivet connecting the two, and a resultant force will be exerted at the front ends of the straps E which will draw them inward, bringing with them the bolts or coupling-pins D, and thus permitting the fall or withdrawal of the shafts from the draw-bar by reason of such withdrawal of the bolts or coupling-pins. In case the rigid flexible strap G is straight, the chain would still be connected therewith at its center, as shown by a single dotted line, and the action would be the same and the force more directly exerted against the pins or bolts D.

J represents a roller mounted in brackets $k$, formed by bending the ends of a plate, K, and securing the same to the bottom of the vehicle. The object of the roller is to reduce the friction of the chain against the body and to guide the same or sustain it in operative position. Both of these functions may be performed by any suitable anti-friction roller, which may be substituted for the roll shown.

To prevent the entire withdrawal of the coupling pins or bolts D from the draw-bar I may groove the same, as shown by dotted line at $d$, longitudinally, and insert a pin, $d'$, in the inner branches of the draw-bars, which pin extends into the groove $d$, and, by reason of the termination of the groove $d$ short of the end of the pin or bolt, the latter is prevented from passing entirely out of and free from the draw-bar. I do not, however, confine my invention to these minor features of construction, but may change them in any manner and to any extent within the judgment of persons conversant in the construction of vehicles.

If desired, a suitable treadle, as L, (dotted lines, Fig. 2,) may be substituted for the ring, stirrup, or handle I, whereby the chain, cord, or strap may be drawn upwardly, as required to operate the flexible strap G. The normal position and effect of the strap G is as shown, and to spread the front ends of the straps or bars E, and thus retain the bolts or pins D in position to connect the shafts to the draw-bars.

Having described my invention and its operation, what I claim is—

1. The combination, with the coupling pins or bolts of a vehicle and side straps secured to the inner ends of said pins or bolts and to the body of the vehicle, of a flexible strap secured at each end to said side straps, and means for drawing the center of said flexible strap rearwardly, substantially as and for the purpose set forth.

2. The combination, with the coupling-pins or bolts of a vehicle, of side straps secured to the same and to the body of the vehicle, of a curved connecting flexible strap, and a chain, cord, or strap secured to the center of said curved flexible strap and extended to a point of ready access within the vehicle, substantially as specified.

3. The combination of the bolts D, straps E, brackets $f$, strap G, and chain H, substantially as shown and described.

4. The combination of the bolts D, grooved as shown, draw-bars B, pins $d'$, strap G, brackets $f$ $k$, roll J, chain H, and handle I, substantially as shown and described.

5. The combination of the draw-bar B, pin $d'$, straps E, and bolt D, having the groove $d'$, substantially as shown and described.

In testimony whereof I affix my signature in presence of two witnesses.

JULIUS BUESCH.

Witnesses:
 JACOB D. BURGER,
 EDWARD H. RENINGER.